US00RE47339E

(19) United States
(12) Reissued Patent
Sites, Jr.

(10) Patent Number: US RE47,339 E
(45) Date of Reissued Patent: Apr. 9, 2019

(54) PERFORATION GUN WITH ANGLED SHAPED CHARGES

(71) Applicant: Joseph A Sites, Jr., Venetia, PA (US)

(72) Inventor: Joseph A Sites, Jr., Venetia, PA (US)

(21) Appl. No.: 15/270,283

(22) Filed: Sep. 20, 2016

Related U.S. Patent Documents

Reissue of:
(64) Patent No.: 9,145,763
Issued: Sep. 29, 2015
Appl. No.: 13/471,597
Filed: May 15, 2012

(51) Int. Cl.
*E21B 43/117* (2006.01)
*E21B 43/119* (2006.01)

(52) U.S. Cl.
CPC ..... *E21B 43/117* (2013.01); *E21B 43/119* (2013.01)

(58) Field of Classification Search
CPC ..... E21B 43/117; E21B 43/119
USPC ..... 175/4.57, 4.6; 166/297, 55
See application file for complete search history.

(56) References Cited

U.S. PATENT DOCUMENTS 3,011,551 A 12/1961 Young et al.
3,419,070 A 12/1968 Ernst
4,583,602 A * 4/1986 Ayers ..... 175/4.52
4,753,301 A * 6/1988 Berry ..... 175/4.6
5,544,711 A * 8/1996 Aitken ..... E21B 43/117 166/55
5,598,591 A * 2/1997 Kelley ..... A47C 17/80 254/122
5,598,891 A 2/1997 Snider et al.
5,775,426 A * 7/1998 Snider ..... E21B 37/08 166/297
5,797,464 A * 8/1998 Pratt et al. ..... 175/4.6
5,894,888 A 4/1999 Wiemers et al.
6,286,598 B1 9/2001 van Petegem et al.
6,758,124 B2 * 7/2004 Barker ..... E21B 43/117 102/310
6,851,471 B2 * 2/2005 Barlow et al. ..... 166/55.2
7,303,017 B2 * 12/2007 Barker et al. ..... 166/297
7,409,992 B2 * 8/2008 Zazovsky et al. ..... 166/297
7,762,351 B2 * 7/2010 Vidal ..... E21B 43/117 175/4.6
7,913,758 B2 3/2011 Wheller et al.
8,033,333 B2 10/2011 Frazier et al.
8,127,848 B2 * 3/2012 Myers et al. ..... E21B 43/119 166/297
8,327,746 B2 * 12/2012 Behrmann et al. ..... 89/1.15
8,684,083 B2 * 4/2014 Torres et al. ..... 166/297
8,769,795 B2 * 7/2014 Kash et al. ..... 29/458
(Continued)

*Primary Examiner* — Jeffrey R Jastrzab
(74) *Attorney, Agent, or Firm* — Metz Lewis Brodman Must O'Keefe LLC

(57) ABSTRACT

A perforation gun which provides a means to create perforations required for the hydraulic fracturing of rock formations for the production of natural gas, oil, and other oil well fluids and further comprises a gun body assembly having an inserted carrier tube to nest shaped charge canisters with built in primers, conical liner, and explosive material. The charges are positioned in various angular patterns along various phase angles to create specifically directed perforation tunnels which puncture scalloped areas of the aforementioned gun body and subsequently penetrate through the wellbore, well casing, well cement, and into the rock formations for the release and removal of natural gas, oil, and other oil well fluids after hydraulic fracturing.

40 Claims, 9 Drawing Sheets

(56) References Cited

U.S. PATENT DOCUMENTS

| | | | | |
|---|---|---|---|---|
| 2004/0118607 | A1* | 6/2004 | Brooks | E21B 43/119 175/4.51 |
| 2005/0247447 | A1 | 11/2005 | Spring et al. | E21B 43/117 166/55.2 |
| 2005/0263286 | A1* | 12/2005 | Sheffield | E21B 47/122 166/297 |
| 2006/0118303 | A1* | 6/2006 | Schultz et al. | 166/297 |
| 2010/0089643 | A1* | 4/2010 | Vidal | E21B 43/117 175/2 |
| 2010/0269676 | A1 | 10/2010 | Behrmann et al. | |
| 2011/0209871 | A1 | 9/2011 | Le et al. | |
| 2013/0019770 | A1* | 1/2013 | Walker | E21B 43/117 102/322 |

* cited by examiner

PERFORATION GUN WITH ANGLED SHAPED CHARGES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

There are currently no applications co-pending with the present application.

FIELD OF THE INVENTION

The presently disclosed subject matter is directed to hydraulic fracturing of rock formations for the production of natural gas, oil, and other well fluids. More particularly this invention relates to well perforation guns that use shaped charges to create directed hydraulic fracturing perforation tunnels.

BACKGROUND OF THE INVENTION

One (1) of the largest and more important industries in the world is energy production. A simple basic fact is that the world in general and America in particular needs energy.

There are many different types of energy: coal, hydro, solar, nuclear, wind and fossil fuels (non-coal fossil fuels). Coal has a reputation for being dirty and shares with nuclear a reputation as being a source of dangerous pollution. Hydro power has been almost fully developed in the United States. Wind and solar power while attractive are unproven as reliable large scale sources of power. However, fossil fuels are well known and widely used sources of power, particularly for vehicle and heating fuels.

Fossil fuels have been widely used for well over a hundred years. The main problems with fossil fuels include price, which is a function of availability. Recovering fossil fuels is become increasingly more difficult as new fields are seldom encountered. However, newer recovery methods have increased the amount of fossil fuels that can be obtained from known fields.

The newer recovery methods include hydraulic fracturing. Hydraulic fracturing is based on creating and propagating fractures in a geological formation by first using explosive shaped charges to create perforation tunnels and subsequently pumping liquids and propant material through the perforation tunnels into the geological formation. Hydraulic fractures enable gas and petroleum contained in the source rocks to migrate into a well where the fossil fuel can be recovered using well-known techniques.

Hydraulic fracturing is not without its problems and technical challenges. Creating effective perforation tunnels is not in itself trivial. Producing controlled explosions within a well bore to create effective perforation tunnels is even more difficult. First the explosion must be at the proper well depth. This typically requires drilling a well to the proper depth followed by the insertion of one (1) or more perforation guns containing explosive charges. Then, for maximum effect the perforation tunnels must be directed towards a desired direction. Since that location might be up, sideways, down, or at a particular angle the explosive charges should be both shaped to form a tight, effective perforation tunnel and directed towards the proper orientation. At well depth both of these desired attributes are difficult to accomplish.

Therefore, a new perforation gun that produces tight, controlled, and effective perforation tunnels in the desired direction would be beneficial. Even more beneficial would be a new perforation gun capable of producing controlled and enhanced perforation tunnels.

SUMMARY OF THE INVENTION

The principles of the present invention provide for a new explosive perforation gun that produces tight, controlled, and effective perforation tunnels in the desired direction. The perforation gun is capable of producing controlled and enhanced effect perforation tunnels.

A perforation gun that is in accord with the present invention includes an outer gun body assembly having a straight steel pipe casing with internal female threads at each end, a plurality of external recessed areas, and an orientation slot extending inward from one (1) end of the steel pipe. The perforation gun further includes a carrier tube assembly having a linear charge tube, a first collar having an external alignment pin that is dimensioned to slide into the orientation slot and which is located at one (1) end of the charge tube, a second collar at the opposite end of the charge tube, a plurality of shaped charge saddle slots through the charge tube, and a plurality of shaped charge body apertures through the charge tube, wherein the plurality of shaped charge saddle slots and the plurality of shaped charge body apertures form a plurality of shape charge holders, and wherein the charge tube is a length of straight steel pipe that is slightly shorter than said outer gun body assembly. The perforation gun further includes a plurality of shaped charges, each having a shaped charge saddle, each having a charge base, and each of which is located in an associated shape charge holder of the plurality of shape charge holders. The carrier tube assembly is inserted into the outer gun body assembly such that the alignment pin slides into the orientation slot to control the orientation of the plurality of shape charges with respect to the external recessed areas.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

FIG. 2b is a section view of the perforation gun 10 taken along section line I-I of FIG. 2a;

DESCRIPTIVE KEY

Figure 1:
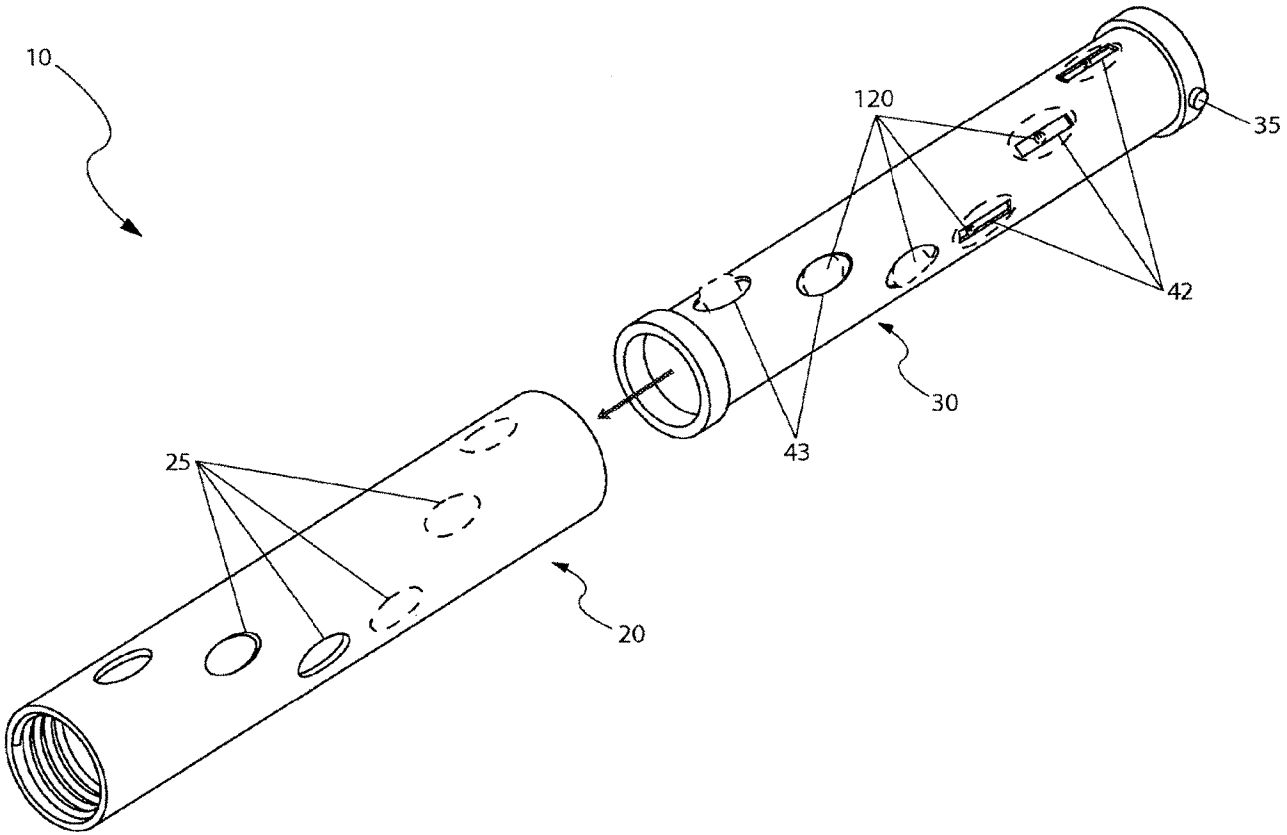
FIG. 1 is an exploded perspective view of a perforation gun 10 having angled shaped charges according to a preferred embodiment of the present invention.

10 perforation gun
20 outer gun body assembly
21 steel pipe casing
22 female threaded region
23 male threaded coupling
24 orientation slot
25 recessed area
26 male threaded region
30 carrier tube assembly
32 charge tube
33a first collar
33b second collar
34 set screw
35 orientation/alignment pin
37 carrier interior space
40 perforation tunnel vector angle
42 shaped charge saddle slot
43 shaped charge body aperture
44 clip feature
60 perforation tunnel vector
80 fan-shot embodiment
82a first fan perforation tunnel vector
82b second fan perforation tunnel vector
82c third fan perforation tunnel vector
82d fourth fan perforation tunnel vector
82e fifth fan perforation tunnel vector
83 down-shot embodiment
84 down-shot perforation tunnel vector
85 limited-entry embodiment
86a first limited-entry perforation tunnel vector
86b second limited-entry perforation tunnel vector
86c third limited-entry perforation tunnel vector
86d fourth limited-entry perforation tunnel vector
86e fifth limited-entry perforation tunnel vector
90 combined limited-entry-fan-shot embodiment
92a first combined perforation tunnel vector
92b second combined perforation tunnel vector
92c third combined perforation tunnel vector
92d fourth combined perforation tunnel vector
92e fifth combined perforation tunnel vector
120 shaped charge canister
125 shaped charge saddle
130 charge base
200 well casing
300 geological formation

DETAILED DESCRIPTION OF THE PREFERRED EMBODIMENT

The best mode for carrying out the invention is presented in terms of its preferred embodiment, herein depicted within FIGS. 1 through 6c, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 2A:
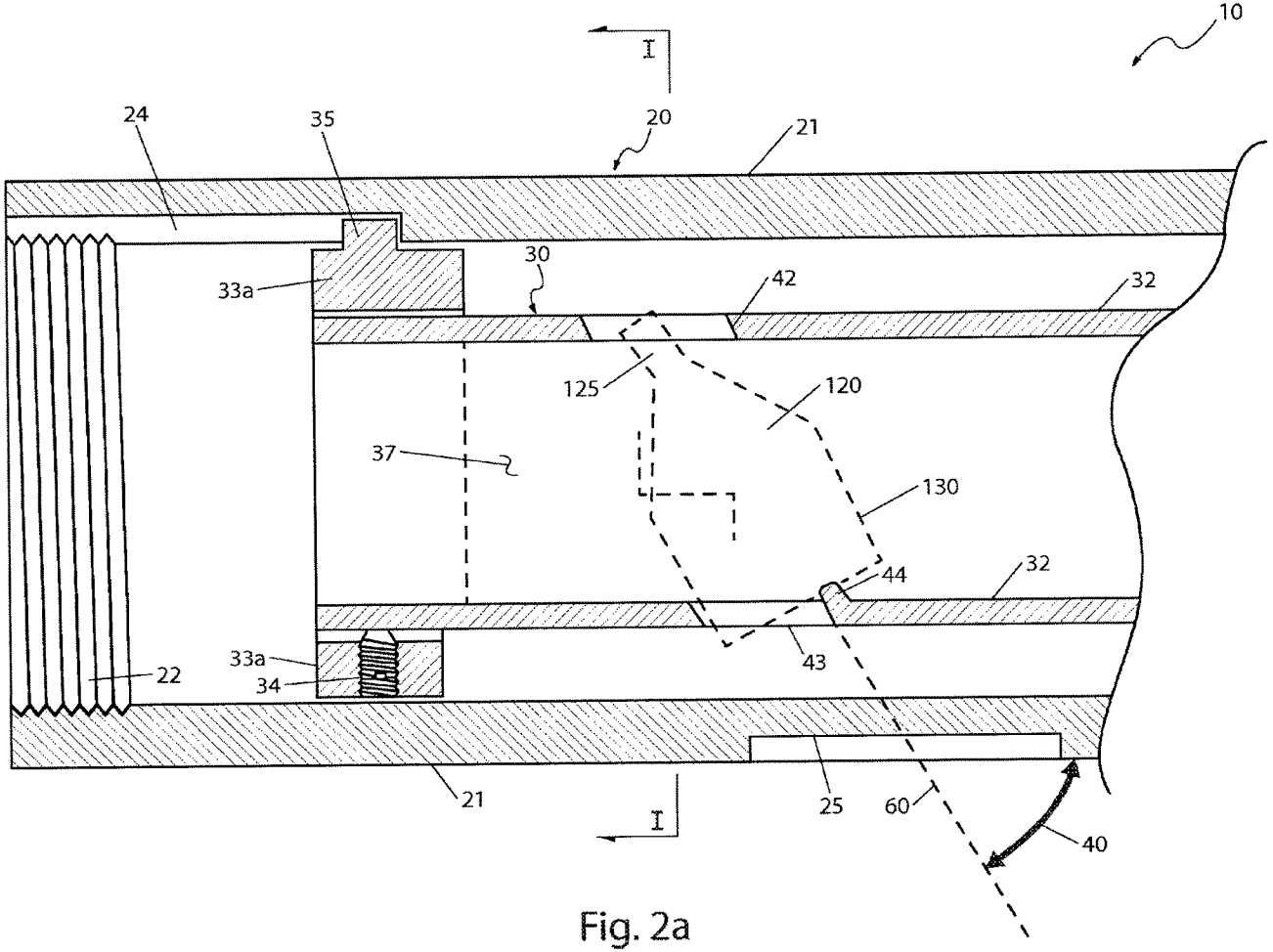
FIG. 2a is a side cut-away view of the perforation gun 10 shown in FIG. 1.
Figure 2B:
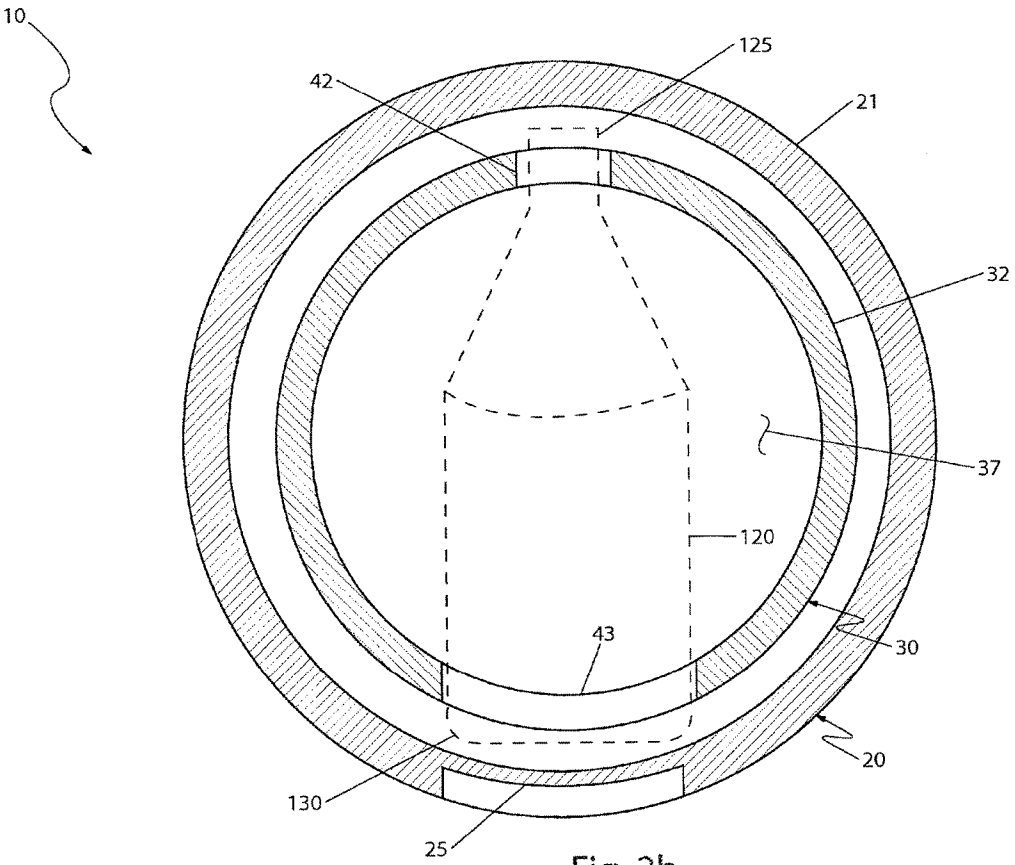

Referring to FIGS. 1, 2a, and 2b, the principles of the present invention provide for a perforation gun 10 that uses angled shaped charges 120 to explosively perforate geological formations 300. The perforation gun 10 is first placed inside a well casing 200 (see FIG. 4), the shaped charges 120 are directed to the desired direction, and then the shaped charges 120 are exploded to create fracture patterns that assist extraction of natural gas, oil, and other oil well fluids.

The perforation gun 10 comprises an outer gun body assembly 20 that receives and accurately positions a carrier tube assembly 30. The outer gun body assembly 20 and the carrier tube assembly 30 are aligned and machined so as to position a plurality of internal shaped charges 120 which create interactive angled perforation tunnel vectors into geological formation 300 (see FIGS. 4 through 6c) upon detonation. Those vectors aid hydraulic fracturing of the geological formation 300 and the release and capture of natural gas, oil, and other oil well fluids.

Each outer gun body assembly 20 includes a variable length of a specially machined straight steel pipe casing 21 that has internal female threaded regions 22 machined at each end, and a plurality of external machined recessed areas 25. The female threaded regions 22 enable any number of outer gun body assemblies 20 to be attached together in an "end-to-end" manner using interconnecting male threaded couplings 23 (see FIG. 4). The recessed areas 25 of the outer gun body assembly 20, which are preferably circular, oval, or rectangular shaped to a depth of approximately one-half (½) of the thickness of the steel pipe casing 21 are arranged to align with corresponding shaped charges 120 that are positioned within the carrier tube assembly 30. Upon detonation, the recessed areas 25 provide weak sections of steel pipe casing 21 that are readily punctured by the perforation jets produced by the exploding shaped charges 120.

The outer gun body assembly 20 includes an orientation slot 24 along an inside surface at one (1) end of the steel pipe casing 21. The orientation slot 24 accurately orientates the carrier tube assembly 30 within the outer gun body assembly 20. The orientation slot 24 works in conjunction with a corresponding orientation/alignment pin 35 of the carrier tube assembly 30. The orientation/alignment pin 35 is a cylindrically-shaped feature having a diameter sized to provide a sliding fit in the orientation slot 24.

During loading of the carrier tube assembly 30 into the outer gun body assembly 20 the orientation/alignment pin 35 is positioned at a trailing end of the carrier tube assembly 30 during insertion. To completely insert the carrier tube assembly 30 into the outer gun body assembly 20 the orientation/alignment pin 35 slides into the orientation slot 24 to properly establish the correct theta (rotational) position of the carrier tube assembly 30 within the outer gun body assembly 20. Complete insertion happens when the orientation/alignment pin 35 abuts the inward end of the orientation slot 24. This longitudinally and rotationally positions the carrier tube assembly 30 within the outer gun body assembly 20 which is then held in place with a recessed snap ring.

Figure 3:
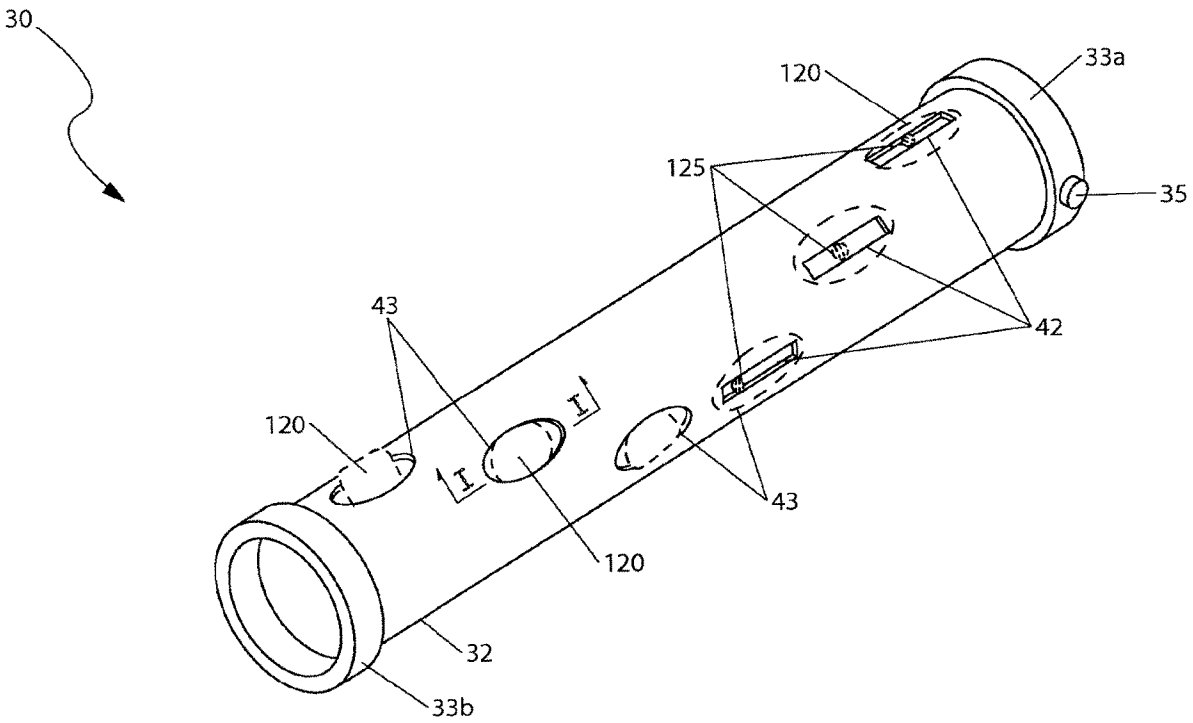
FIG. 3 is a perspective view of a carrier tube assembly 30 of the perforation gun 10 shown in FIG. 1.

Referring now primarily to FIGS. 2a and 3, the carrier tube assembly 30 includes a linear charge tube 32, a first collar 33a, a second collar 33b, a plurality of shaped charge saddle slots 42, and a plurality of shaped charge body apertures 43. The charge tube 32 is a length of specially prepared straight steel pipe slightly shorter than the outer gun body assembly 20 into which it is installed. The charge tube 32 enables attachments to the collars 33a, 33b via respective threaded set screws 34 (only one shown in FIG. 2a). The first collar 33a includes the aforementioned integral orientation/alignment pin 35 which protrudes perpendicularly to engage the corresponding orientation slot portion 24 as previously described.

The shaped charge saddle slots 42 comprise circular, rectangular, or oval-shaped features that are machined through the charge tube 32 to allow insertion of a shaped charge saddle 125 of a shaped charge 120 placed inside the carrier tube assembly 30. Each shaped charge saddle slot 42 has a corresponding shaped charge body aperture 43 that is machined through an opposing surface of the charge tube 32. Each shaped charge body aperture 43 comprises a circular or cylindrical-shaped machined feature having a diameter dimensioned to receive a charge base 130 of a shaped charge 120.

Referring now primarily to FIG. 2b, the system 10 uses a plurality of commercially-available shaped charges 120 such as those available from OWEN OIL TOOLS™, TITAN SPECIALTIES, LTD™, and others. Each shaped charge 120 has a cylindrical shaped charge base 130 having a single protruding conical-shaped end that forms the shaped charge saddle 125. Each shaped charge 120 also has a contained explosive, a conical metal liner, a shaped charge body, and built in primers. The direction of a shape charge 120 can be variably directed via the joint angular and positional characteristics of a shaped charge saddle slot 42 and a shaped charge body aperture 43 that directs an explosion toward a recessed area 25. Selective pairings of shaped charge saddle slots 42 and shaped charge body apertures 43 can angle a shaped charge 120 [toward an] *generally in the direction of one* end of the carrier tube assembly 30 along a plane which [is parallel to and] horizontally [extending] *extends* along the center of the carrier tube assembly 30 (see FIGS. 5 through 6c).

Referring now primarily to FIG. 2a, located along the perimeter of each shaped charge body aperture 43 is at least one (1) machined clip feature 44 which comprises a malleable, finger-shaped appendage that can be bent and positioned using a hand tool against the charge base portion 130 of a shaped charge canister 120 to secure the shaped charge canister 120 in position.

Referring again to FIG. 3, the carrier tube assembly 30 can be incrementally positioned such that the shaped charge saddle slots 42 and shaped charge body apertures 43 align the shaped charge canisters 120 at selective phase angles along a spiral or straight pattern from one (1) end of the carrier tube assembly 30 to the other. It is understood that various phase angles such as one-hundred-eighty (180°) degrees, ninety (90°) degrees, sixty (60°) degrees, and the like may be used based upon a user's preference to produce a desired geological perforation formation 300 and hydraulic fracturing effect.

Figure 4:
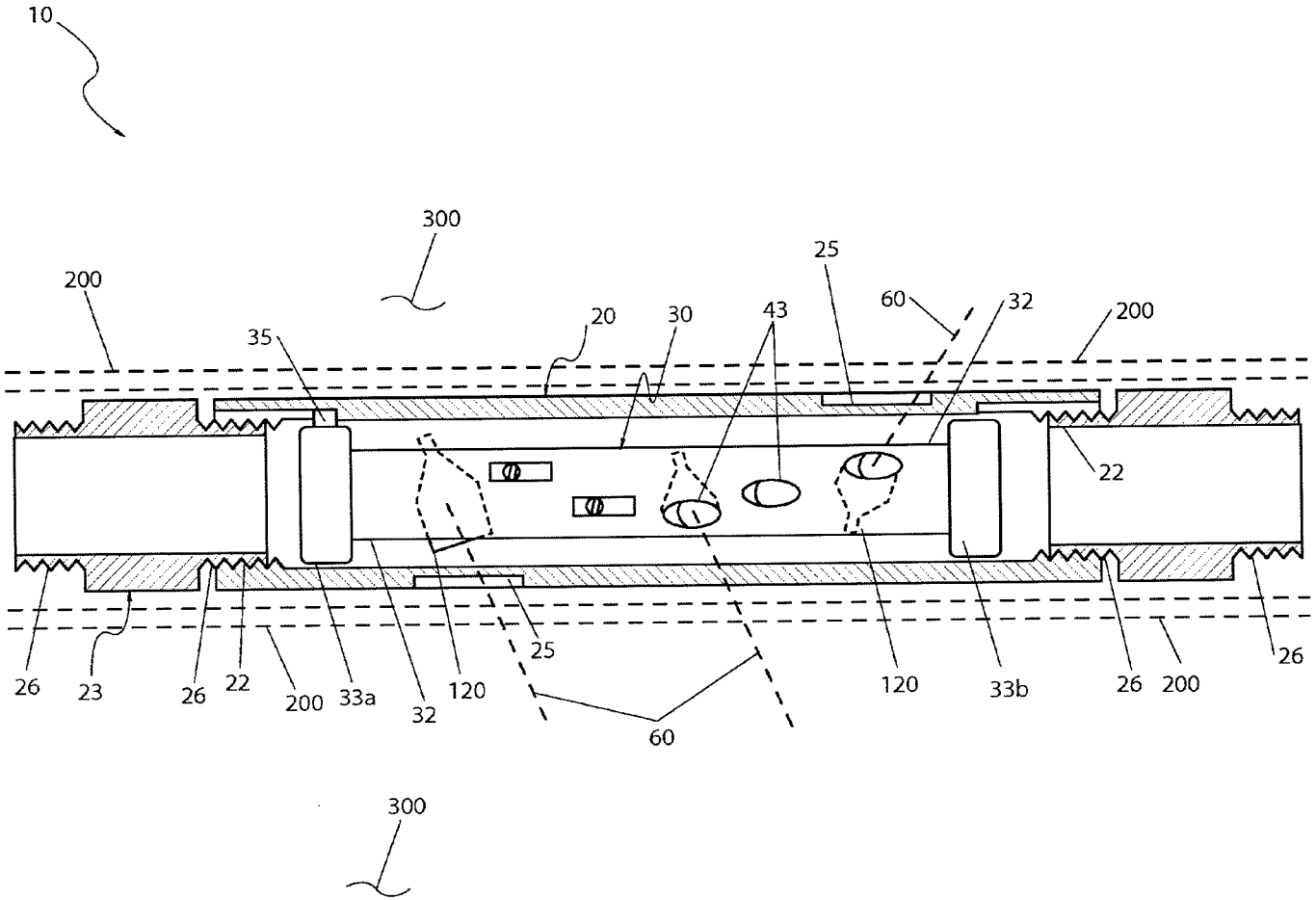
FIG. 4 is a side cut-away view of the perforation gun 10 shown in FIGS. 1 and 3 in use.

Referring now to FIG. 4, which is a side cut-away view of the system 10 in use, the system 10 includes the outer gun body assembly 20 with threaded couplings 22 at each end. Male couplings 23 provide male threaded regions 26 that mate with female threaded region 22. This enables any number of desired outer gun body assemblies 20, each containing a carrier tube assembly 30 to be coupled together to create a selective length system 10.

Upon detonation, the angular positioning of the shaped charges 120 with respect to corresponding shaped charge saddle slots 42 and shaped charge apertures 43 produce directed perforation tunnel vectors 60 that penetrate the well casing structure 200, any surrounding well casing cement, and the surrounding geological formation 300. The outer gun body assemblies 20 and the carrier tube assemblies 30 may be specifically machined with the aforementioned features 42, 43 to enable positioning of the shaped charges 120 at various phase angles and angular orientations to create desired geological formation perforations and subsequent fracturing.

Figure 5:
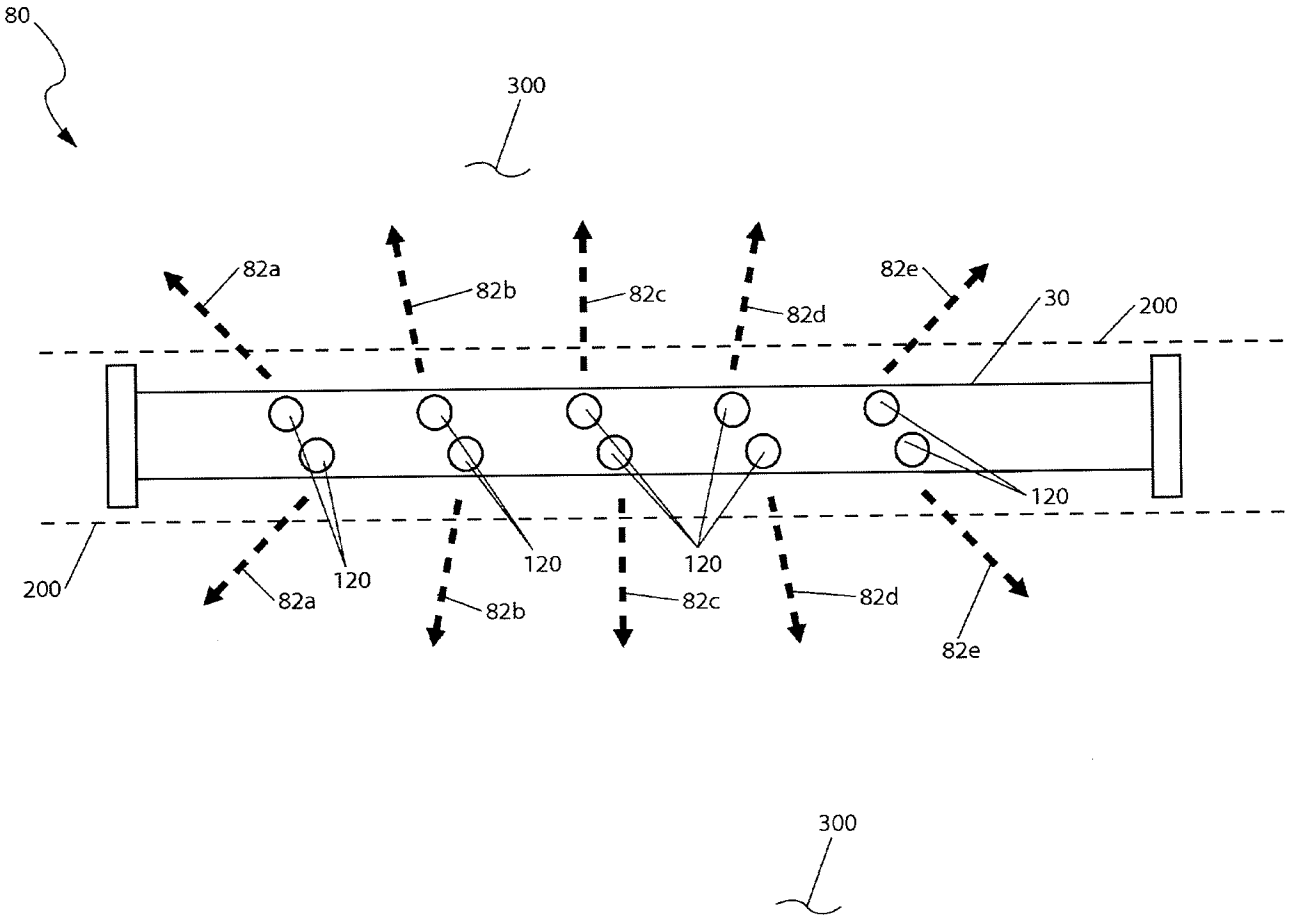
FIG. 5 is an exemplary perforation tunnel vector diagram for the perforation gun 10 shown in FIGS. 1, 3, and 4 according to a preferred fan-shot embodiment 80.
Figure 6A:
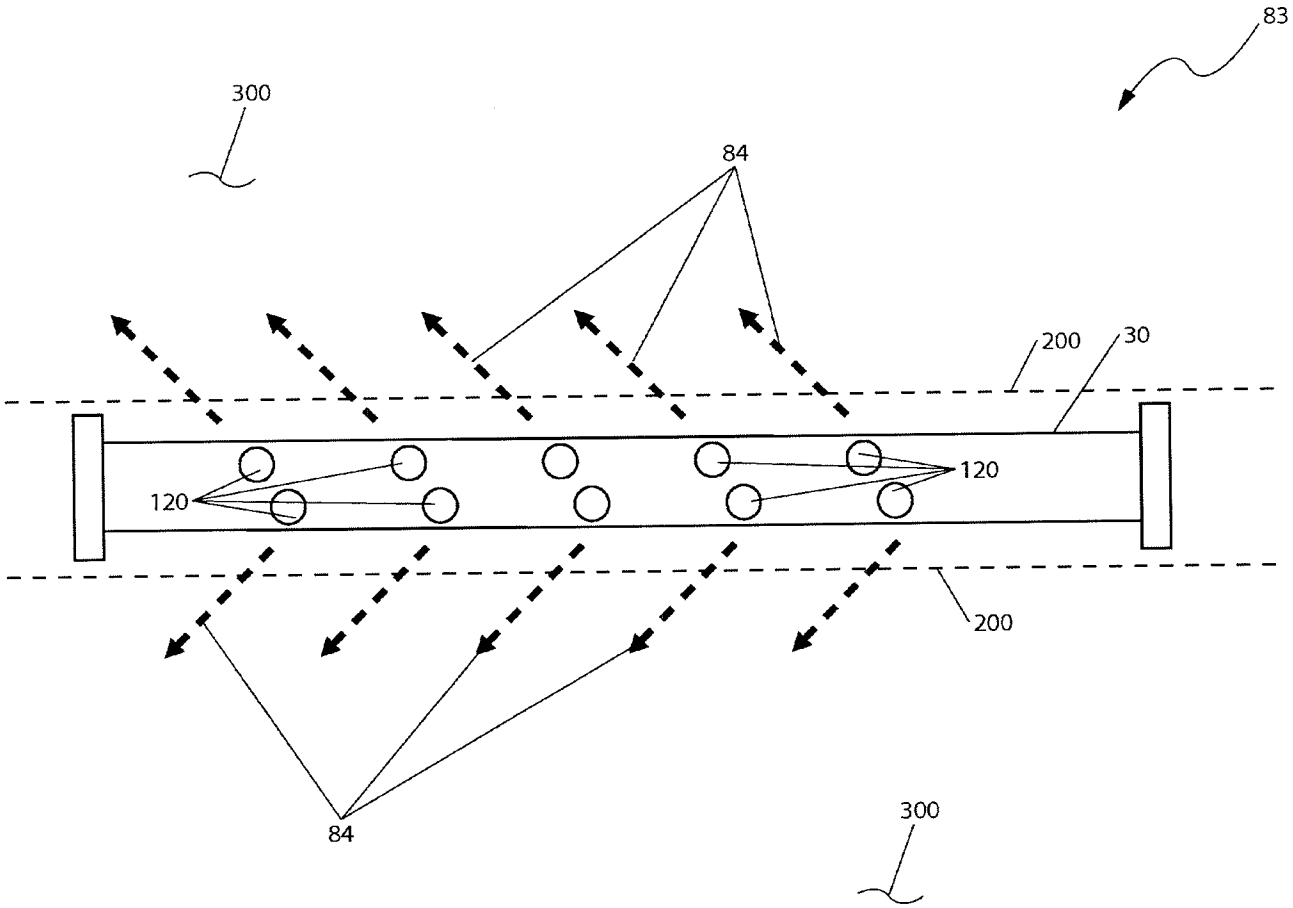
FIG. 6a is an exemplary perforation tunnel vector diagram for the perforation gun 10 using a down-shot embodiment 83.
Figure 6B:
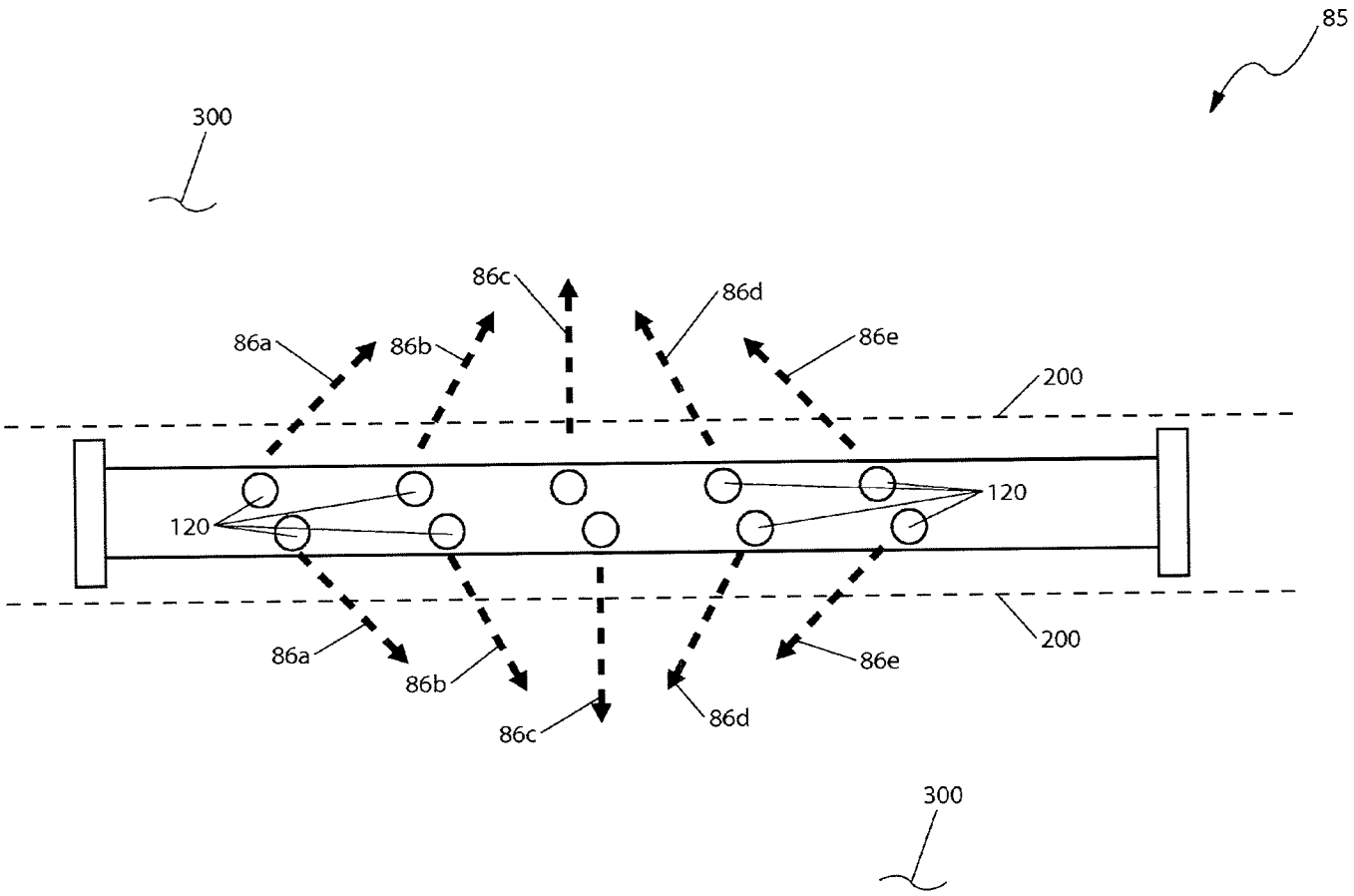
FIG. 6b is an exemplary perforation tunnel vector diagram of a limited-entry embodiment 85 of the invention; and, FIG. 6c is an exemplary fracture perforation tunnel vector diagram of a combined-limited-entry-fan-shot embodiment 90 of the invention.
Figure 6C:
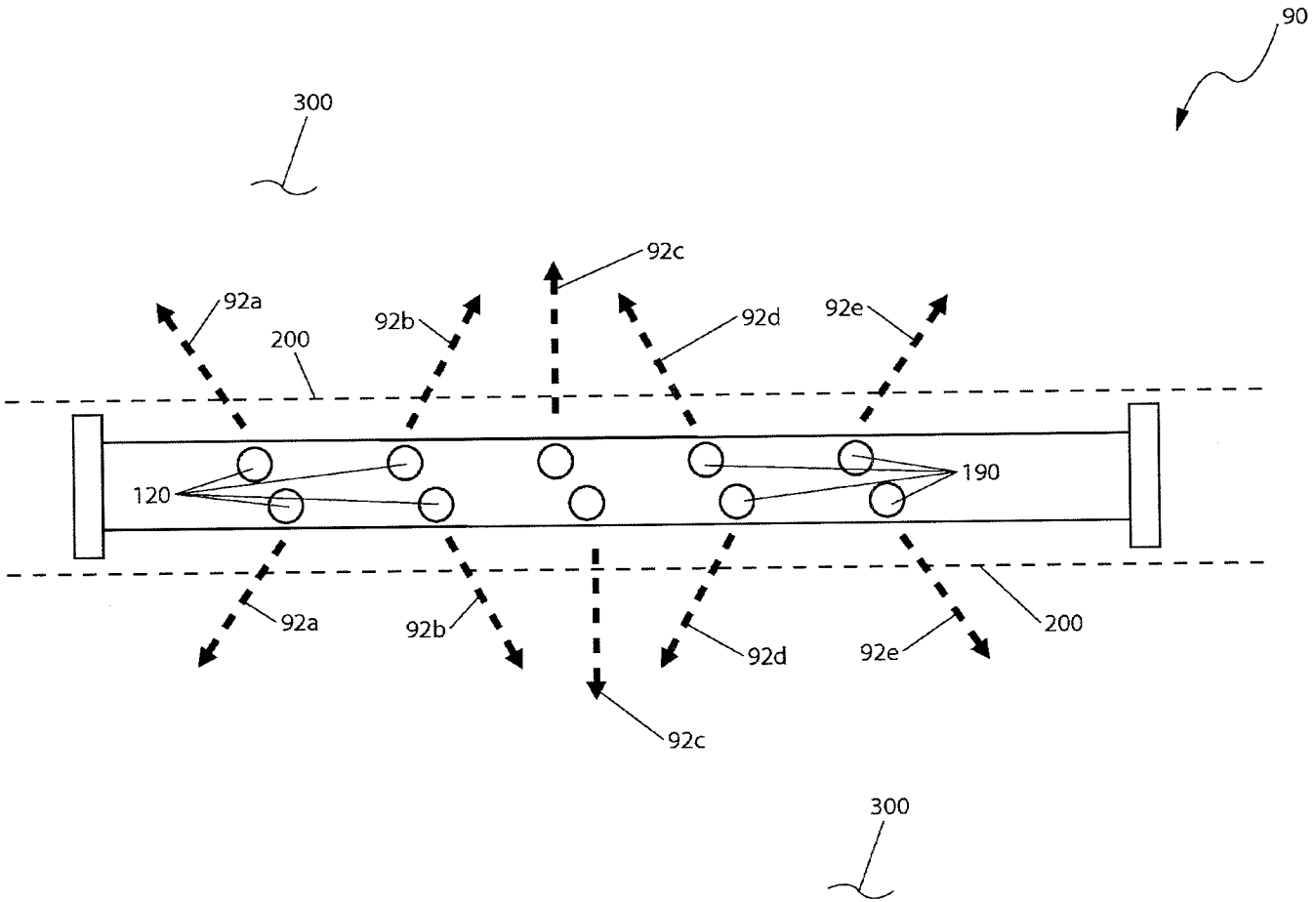

Possible perforation tunnel vectors 60 are illustrated in FIGS. 5 through 6c. FIG. 5 shows a preferred fan-shot pattern 80. The carrier tube assembly 30 is configured with shaped charge 120 oriented and arranged at a selected phase angle to form a fan-shot pattern 80 upon detonation. The fan shot pattern 80 is produced by arranging groups of shaped charges 120 at phase angles that progressively increase along the length of the carrier tube assembly 30. The shaped charges 120 produce monotonically decreasing (measured in an X-Y plane with 0° toward the right) perforation tunnel vectors 60 comprising first fan perforation tunnel vectors 82a (such as 135°) near the left hand side of the carrier tube assembly 30, smaller angled second fan perforation tunnel vectors 82b (such as 120°) further way from the left hand side, substantially perpendicular third fan perforation tunnel vectors 82c at the middle of the carrier tube assembly 30, smaller angled fourth fan perforation tunnel vectors 82d (such as 60°) past the middle of the carrier tube assembly 30, and still smaller angled fifth fan perforation tunnel vectors 82e (such as 45°) near the right hand side of the carrier tube assembly 30. The actual number and angle of the shaped charge canisters 120 and resulting fan perforation tunnel vectors 82a, 82b, 82c, 82d, 82e, may be selectively varied to produce a desired fracturing effect.

FIG. 6a shows another set of preferred perforation tunnel vectors 60 arranged to produce a down-shot pattern 83. The down-shot pattern 83 is produced by arranging groups of shaped charges 120 at fixed angles, such as 135° along the length of the carrier tube assembly 30. The down-shot pattern 83 is directed downward. However, by inverting the carrier tube assembly 30 an up-shot pattern that is directed upward can be produced. The actual angle of the shaped charge 120 and resulting down-shot pattern 83 (or up-shot pattern) can be varied to produce a desired geological formation 300 perforation tunnels and subsequent hydraulic fracturing effect.

FIG. 6b shows another set of preferred perforation tunnel vectors 60 arranged in a limited-entry pattern 85. The limited-entry pattern 85 is produced by arranging groups of shaped charges 120 to produce perforation tunnel vectors 60 having angles that monotonically vary from the nearest end of the carrier tube assembly 30 toward 90° at the middle of the carrier tube assembly 30. For example, first limited-entry perforation tunnel vectors 86a near the left hand side of the carrier tube assembly 30 at an angle of 45°, second limited-entry perforation tunnel vectors 86b further toward the middle of the carrier tube assembly 30 at an angle of 60°, third limited-entry perforation tunnel vectors 86c at the middle of the carrier tube assembly 30 that are perpendicular to the carrier tube assembly 30, fourth limited-entry perforation tunnel vectors 86d located to the right of the middle of the carrier tube assembly 30 having an angle of 120°, and fifth limited-entry perforation tunnel vectors 86e nearest the right hand side of the carrier tube assembly 30 at an angle of 135°.

The limited-entry pattern 85 shown in FIG. 6b produces limited-entry perforation tunnels 86a, 86b, 86c, 86d, 86e that collectively concentrate the explosive forces from the shaped charges 120 to produce a desired geological formation 300 perforation tunnel and subsequent hydraulic fracturing effect. Again, it should be noted that the angles can be selectively varied to produce a desired perforation tunnel geometry and subsequently hydraulic fracturing effect.

FIG. 6c shows another set of preferred perforation tunnel vectors 60, but this time arranged in a limited-entry-fan-shot embodiment 90. The limited-entry-fan-shot embodiment 90 is produced by arranging groups of shaped charges 120 to produce perforation tunnel vectors 60 having angles that spread out in a wide angle across the carrier tube assembly 30 from each end to the middle, with the middle perforation tunnel vectors 60 being perpendicular to the carrier tube assembly 30. The shaped charges 120 are arranged along selected phase angles to produce the combined limited-entry-fan-shot embodiment 90.

The combined limited-entry-fan-shot embodiment 90 is envisioned as producing a plurality of first combined perforation tunnel vectors 90a (say at 135°) near the left hand side, second combined perforation tunnel vectors 90b (say at 45°) left of the center of the carrier tube assembly 30, third combined perforation tunnel vectors 90c at the center of the carrier tube assembly 30 and at 90°, fourth combined perforation tunnel vectors 90d right of the center of the carrier tube assembly 30 (say at 135°), and fifth combined perforation tunnel vectors 90e near the right hand side of the carrier tube assembly 30 (say at 45°). Such an arrangement of combined limited-entry perforation tunnel vectors 90a, 90b, 90c, 90d, 90e diffuse the perforation jets from the system 10 at some locations while concentrating them at the middle of the carrier tube assembly 30 so as to produce a desired geological formation 300 perforation geometry and subsequently hydraulic fracturing effect. The combined limited-entry-fan-shot perforation tunnel vectors 90a, 90b, 90c, 90d, 90e are described as emanating at suggested angles; however, the actual number and angles of the shaped charges 120 and resulting perforation tunnel vectors 90a, 90b, 90c, 90d, 90e may be selectively varied to produce a desired fracturing effect.

It is envisioned that other styles and configurations of the present invention can be easily incorporated into the teachings of the present invention; only one (1) particular configuration is shown and described for purposes of clarity and disclosure and not by way of limitation of scope.

The preferred embodiment of the present invention can be utilized by technicians skilled in the art after having received appropriate instructions in the configuring and assembly of the system 10. After initial purchase or acquisition of the system 10, it would be installed as indicated in FIGS. 1 through 4.

The method of using the system 10 may be achieved by performing the following steps: procuring a number of matched outer gun body assemblies 20 and carrier tube assemblies 30 having desired overall lengths, phase angles, and being machined with properly aligned recessed areas 25, shaped charge saddle slots 42, and shaped charge body apertures 43 so as to produce a desired geological formation perforation effect with subsequent hydraulic fracturing upon detonation; inserting an initial carrier tube assembly 30 into a matching outer gun body assembly 20 until obtaining full engagement of the orientation/alignment pin 35 within the corresponding orientation slot 24 and securing in place with a snap ring; inserting the system 10 within a horizontal well casing structure in a conventional manner; detonating the system 10 remotely in a normal manner to produce perforation tunnel vectors 60 being projected into surrounding geological formation(s) at desired angles and directions, thereby producing a desired geological formation 300 perforation effect with subsequent fracturing effect using the present invention 10.

The method of utilizing additional units of the system 10 may be achieved by performing the following steps: inserting any additional carrier tube assemblies 30, as desired, into respective outer gun body assemblies 20; arranging the outer gun body assemblies 20 in a desired sequential order in a linear manner; joining adjacent outer gun body assemblies 20 by threading the male threaded regions 26 of the connecting couplings 23 to the female threaded regions 22 of the adjacent outer gun body assemblies 20; and, performing detonation, perforation, and subsequent hydraulic fracturing as described above.

It is further understood that during preparation and assembly of the system 10, as described above, any number or sequence of patterns from the system 10 can be produced; including the fan shot pattern 80, the down-shot pattern 83, the limited-entry pattern 85, and the alternate combined limited-entry-fan-shot pattern 90. The various patterns can also be mixed to produce a desired geological formation 300 perforation jet geometry and subsequent hydraulic fracturing effect.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A perforation gun, comprising:

an outer gun body assembly having a first straight steel pipe with internal female threads at each end, a plurality of external recessed areas, and an orientation slot extending inward from one end of said first straight steel pipe;

a carrier tube assembly having a linear charge tube which has an external surface, a first collar having an external alignment pin dimensioned to slide into said orientation slot, said first collar fits over one end of said charge tube into an installed position radially outward of said external surface, a second collar that fits over the opposite end of said charge tube, a plurality of shaped charge saddle slots through said charge tube, and a plurality of *corresponding* shaped charge body apertures through said charge tube, wherein said *each of said* plurality of shaped charge saddle slots and *corresponding ones of* said plurality of shaped charge body apertures form a plurality of shaped charge holders, and wherein said charge tube is a length of a second straight steel pipe slightly shorter than said outer gun body assembly; and a plurality of shaped charges, each*:* having a shaped charge saddle, [each having] a charge base[,] and [each of which is located] *received and restrained* in [an associated shaped charge holder] *one* of said plurality of shaped charge holders *by its respective shaped charge saddle inserted in a corresponding shaped charge saddle slot and being angularly adjustable therein*;

wherein said carrier tube assembly is inserted into said outer gun body assembly such that said alignment pin slides into said orientation slot so as to control the orientation of said plurality of shaped charges with respect to said external recessed areas; and wherein said first collar is locked into position relative to said charge tube *by insertion of said alignment pin in said orientation slot*.

2. The perforation gun according to claim 1, wherein said internal female threads [are] *further comprise a* machined *surface*.

3. The perforation gun according to claim 1, wherein said external recessed areas are machined approximately half way through said first straight steel pipe.

4. The perforation gun according to claim 1, further including a male coupling having threaded male members on each end, wherein said male coupling is attached to one end of said first straight steel pipe by threading into said internal female threads, and wherein said male coupling enables attachment of a second perforation gun.

5. The perforation gun according to claim 4, comprising two individual perforation guns joined together by male coupling.

6. The perforation gun according to claim 1, wherein said first collar is locked to said charge tube by a set screw.

7. The perforation gun according to claim 6, wherein said position of said first collar can be adjusted on said charge tube such that said alignment pin engages said orientation slot to controllably orientate the position of said shaped charges with respect to said recessed areas.

8. The perforation gun according to claim 1, wherein each shaped charge saddle slot is machined through said charge tube to allow insertion of a shaped charge saddle.

9. The perforation gun according to claim 8, wherein each shaped charge body aperture is machined through said charge tube to allow insertion of a charge base.

10. The perforation gun according to claim 9, wherein each shaped charge is secured in position by a malleable appendage that extends from said carrier tube to contact that shaped charge's charge base.

11. The perforation gun according to claim 1, wherein said plurality of shaped charges are orientated with respect to said recessed areas by said orientation slot so as to produce a desired geological fracturing effect.

12. The perforation gun according to claim 11, wherein said plurality of shaped charges are orientated with respect to said recessed area to produce a fan shot pattern.

13. The perforation gun according to claim 12, wherein said fan shot pattern is produced by arranging groups of shaped charges at phase angles that progressively increase along said carrier tube assembly so as to produce monotonically decreasing perforation tunnel vectors.

14. The perforation gun according to claim 11, wherein said plurality of shaped charges are orientated with respect to said recessed area to produce a down-shot pattern.

15. The perforation gun according to claim 14, wherein said down-shot pattern is produced by arranging groups of shaped charges at fixed angles along said carrier tube assembly.

16. The perforation gun according to claim 11, wherein said plurality of shaped charges are orientated with respect to said recessed area to produce a limited-entry pattern.

17. The perforation gun according to claim 16, wherein said limited-entry pattern is produced by arranging groups of shaped charges to produce perforation tunnel vectors having angles that monotonically vary from each end of said carrier tube assembly toward 90° at the middle of said carrier tube assembly.

18. The perforation gun according to claim 11, wherein said plurality of shaped charges are orientated with respect to said recessed area to produce a limited-entry-fan-shot pattern.

19. The perforation gun according to claim 18, wherein said limited-entry-fan-shot pattern is produced by arranging groups of shaped charges to produce perforation tunnel vectors having angles that spread out in a wide angle across said carrier tube assembly from each end to the middle of said carrier tube, with the middle perforation tunnel vector perpendicular to said carrier tube assembly.

*20. The perforation gun according to claim 1, wherein said plurality of shaped charge saddle slots further comprise circular, rectangular or oval shaped features through said charge tube to allow insertion of a shaped charge saddle.*

*21. The perforation gun according to claim 1, wherein a shaped charge is secured in position within at least one of said plurality of shaped charge holders by a clip.*

*22. The perforation gun according to claim 21, wherein said clip is selectively engaged with said shaped charge to permit insertion and retention of said shaped charge in said at least one of said plurality of shaped charge holders.*

*23. The perforation gun according to claim 1, wherein at least a portion of said plurality of shaped charge holders are orientated to receive a shaped charge at a non-perpendicular angle with respect to said external surface of said charge tube.*

*24. A perforation gun according to claim 23, wherein said at least a portion of said plurality of shaped charge holders are orientated to receive said shaped charge at varying angles with respect to said external surface of said charge tube.*

*25. A perforation gun according to claim 24, wherein said charge tube has a midpoint along its axial length and said varying angles of said shaped charge holders decrease along said axial length of said carrier assembly from said midpoint to each end, creating a limited entry explosive pattern.*

*26. A perforation gun according to claim 25, wherein said at least a portion of said plurality of shaped charge holders are additionally orientated in a spiral pattern along the axial length of said charge tube.*

*27. A perforation gun according to claim 25, wherein said shaped charge is secured in position within at least one of said plurality of shaped charge holders by a clip.*

*28. The perforation gun according to claim 27, wherein said clip is selectively engaged with said shaped charge to permit insertion and retention of said shaped charge in said at least one of said plurality of shaped charge holders.*

*29. A perforation gun for creating a pattern of perforation tunnels in at least one of a well casing and a rock formation, said perforation gun comprising:*

*an outer gun body having an interior space, an exterior surface and a longitudinal axis, said exterior surface having a plurality of recessed areas forming a spiral pattern along said longitudinal axis; and*

*a carrier selectively axially mounted in a preselected position within said interior space of said outer gun body, said carrier having:*

*a longitudinal axis coincident with said longitudinal axis of said outer gun body;*

*an axis perpendicular to and extending outwardly from said longitudinal axis at a preselected point along said longitudinal axis dividing said longitudinal axis into two portions;*

*a plurality of shaped charge bodies; and*

*a plurality of spaced apart shaped charge holders, extending along said longitudinal axis, sized and shaped to: (i) receive and restrain each of said plurality of shaped charge bodies interiorly adjacent to corresponding ones of said plurality of recessed areas of said outer gun body and form a coincident preselected spiral pattern along with longitudinal axis; and (ii) expel a focused explosive charge therefrom along a charge vector extending radially outwardly from said longitudinal axis and forming an included phase angle with said perpendicular axis; at least a plural portion of said plurality of said shaped charge holders being mounted in a preselected pattern along said longitudinal axis such that said charge vectors are non-intersecting and independently form monotonically decreasing included phase angles with respect to perpendicular axis creating a limited entry explosive pattern.*

*30. A perforation gun according to claim 29, wherein said carrier has two ends and said perpendicular axis is located at a midpoint along said longitudinal axis.*

*31. A perforation gun according to claim 29, wherein said carrier has two ends and a midpoint along said longitudinal axis and a portion of said varying phase angles of said shaped charge holders monotonically increase along said longitudinal axis from said midpoint to each end, creating a fan-shaped explosive pattern and a portion of said varying angles of said shaped charge holders monotonically decrease along said longitudinal axis from said midpoint to each end, creating a limited entry explosive pattern.*

*32. A perforation gun according to claim 29, wherein the shape of said plurality of charge holders further comprise at least one of saddle apertures and body apertures which are selected from the group consisting of circles, ovals and rectangles.*

*33. A perforation gun according to claim 29, wherein said carrier further comprises at least one collar defining a spaced apart relationship between said carrier and said outer gun body.*

*34. A perforation gun according to claim 29, wherein at least one of said carrier and said outer gun body further comprise an alignment pin mountable in a corresponding orientation slot in at least one other of said carrier and said outer gun body to register said carrier with said outer gun body such that said plurality of charge holders are aligned with said plurality of said recessed areas of said outer gun body.*

*35. A perforation gun according to claim 29, further comprising at least one coupler mounted on an end of said outer gun body to affix at least one other perforation gun in a linear, axial relationship with said perforation gun.*

*36. A perforation gun according to claim 29, wherein at least one of said plurality of shaped charge bodies is secured in position within at least one of said plurality of shaped charge holders by a clip.*

*37. A perforation gun according to claim 36, wherein said clip is selectively engaged with at least one of said plurality of shaped charge bodies to permit insertion and retention of said shaped charge body in one of said plurality of shaped charge holders.*

*38. A perforation gun according to claim 37, wherein said clip is malleable.*

*39. A perforation gun according to claim 20, wherein said shaped charge saddle slot features form a perimeter which directly receives and restrains said shaped charge saddle.*

*40. A perforation gun according to claim 39, wherein said shaped charge saddle slot features are integral with said carrier tube.*

* * * * *